US006053360A

United States Patent [19]

Rutter

[11] Patent Number: 6,053,360

[45] Date of Patent: Apr. 25, 2000

[54] FITMENT FOR A FLEXIBLE CONTAINER

[75] Inventor: Christopher C. Rutter, Oakland, Calif.

[73] Assignee: Packaging Systems, Inc., Romeoville, Ill.

[21] Appl. No.: 09/108,430

[22] Filed: Jul. 1, 1998

[51] Int. Cl.[7] ...................... G01F 11/00

[52] U.S. Cl. ...................... 222/1; 222/82; 222/83; 222/95; 222/96; 222/105; 222/527

[58] Field of Search ...................... 222/81, 82, 83, 222/91, 95, 96, 105, 527

[56] References Cited

U.S. PATENT DOCUMENTS

| | | | |
|---|---|---|---|
| 3,081,911 | 3/1963 | Scholle | 222/107 |
| 3,087,655 | 4/1963 | Scholle | 222/183 |
| 3,138,293 | 6/1964 | Roak et al. | 222/105 |
| 3,171,571 | 3/1965 | Daniels | 222/94 |
| 3,212,681 | 10/1965 | Weikert | 222/183 |
| 3,638,834 | 2/1972 | Goodrich et al. | 222/105 |
| 4,138,036 | 2/1979 | Bond | 222/105 |
| 4,174,051 | 11/1979 | Edwards et al. | 222/105 |
| 4,257,535 | 3/1981 | Mellett | 222/83 |
| 4,325,496 | 4/1982 | Malpas | 222/83 |
| 4,375,864 | 3/1983 | Savage | 222/81 |
| 4,475,670 | 10/1984 | Rutter | 222/83 |
| 4,493,438 | 1/1985 | Rutter | 222/83 |
| 4,513,885 | 4/1985 | Hogan | 222/95 |
| 4,570,826 | 2/1986 | Fattori | 222/83 |
| 5,130,020 | 7/1992 | Meckstroth | 210/264 |
| 5,297,696 | 3/1994 | Bernstein et al. | 222/83 |
| 5,334,180 | 8/1994 | Adolf et al. | 222/81 |
| 5,678,735 | 10/1997 | Guglielmini | 222/527 |
| 5,749,493 | 5/1998 | Boone et al. | 222/105 |

*Primary Examiner*—Joseph A. Kaufman

*Attorney, Agent, or Firm*—Wallenstein & Wagner, Ltd.

[57] ABSTRACT

A fitment for a flexible container and method of using the same, especially suitable for use with a dispensing system having a peristaltic pump. The fitment having a generally cylindrical base assembly and an outlet port for providing access to the contents of the container, and a spout body dimensioned to attach to the base assembly to form a fluid flow path between the base assembly and spout body. A cap and barrier material may also be provided to seal the outlet port of the container and protect against contamination.

26 Claims, 3 Drawing Sheets

FIG. 7
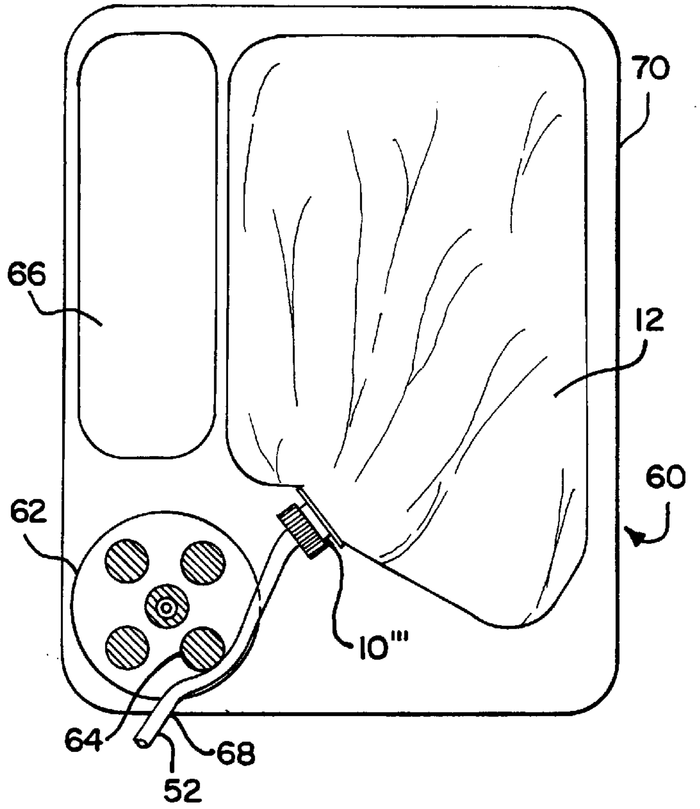
FIG. 8
PRIOR ART
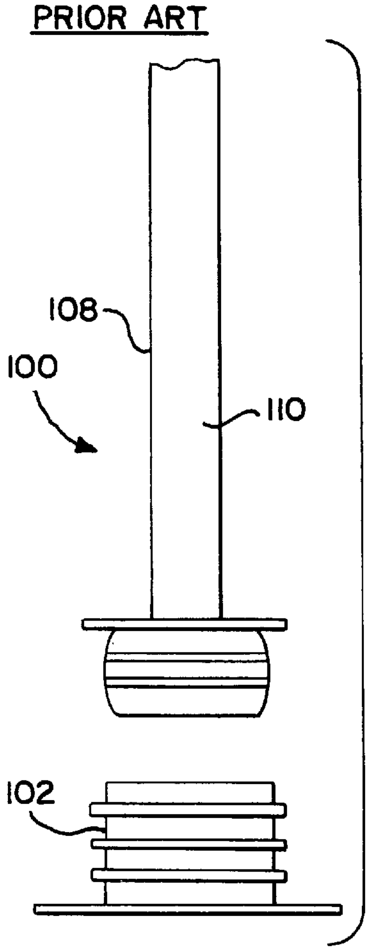
FIG. 6
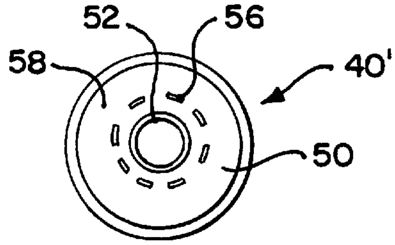
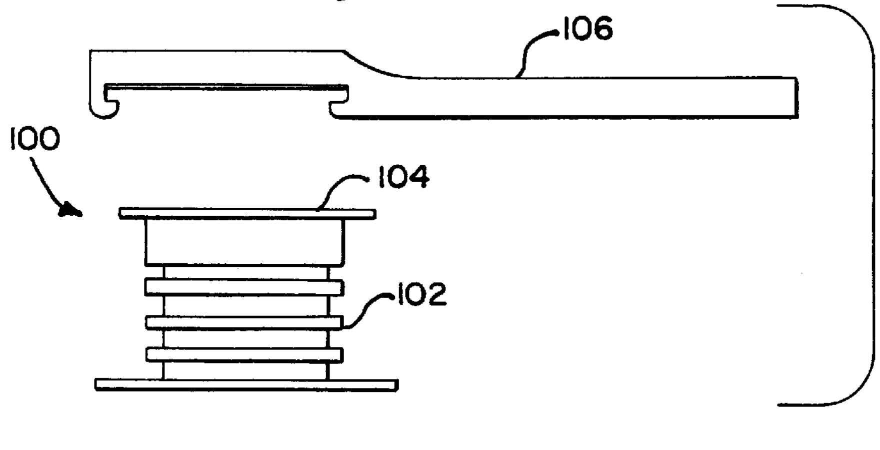
FIG. 9
PRIOR ART

FITMENT FOR A FLEXIBLE CONTAINER

TECHNICAL FIELD

The present invention relates generally to an improved fitment for a flexible container and more specifically, to a fitment for providing easy assembly and installment into a dispensing system and for protecting against contamination of the contents of a flexible container.

BACKGROUND OF THE INVENTION

Fitments are often used with flexible containers such as liquid filled bags. These bags are typically made of a flexible plastic and are filled with a variety of liquid food products which may become easily contaminated by exposure to air. Fitments provide a means through which flexible containers may be filled and emptied while minimizing contamination to the contents of the container. Fitments may also be used in conjunction with liquid dispensing systems, such as a dispensing system having a peristaltic pump to regulate the flow and amount of liquid dispensed. These dispensing systems often are used in restaurants or local convenience stores to facilitate self-service of liquid food products such as syrups, toppings, and other similar condiments.

As shown in Prior Art FIGS. 8 and 9, a typical fitment 100 has a base 102 that is affixed to a flexible container to form an opening through which the container may be filled. After the container is filled with a desired liquid, a cap 104 or similar closure is normally attached to the base 102 and used to seal the container and protect it from contamination. Depending on the type of liquid contents, the container and its contents then are usually heat sterilized through an autoclave method or similar process.

To gain access and to dispense the contents of the container, the cap 104 must be removed from the base 102 of the fitment 100. (See FIG. 9.) Generally in prior fitments 100, these caps 104 require a tool 106 to remove because the heat sterilization process causes the cap 104 to become rigidly affixed to the base 102. Numerous tools 106, such as wrenches and other similar devices, are used to manually pry off the cap 104.

Prior fitments 100 have presented several problems for end users attempting to remove the fitment 100 prior to use. For example, because an appropriate tool 106 capable of prying off the cap 104 must be used, the removal process is complicated. These tools 106 are often misplaced and unavailable when needed, making removal of the cap 104 very difficult. Also, because a great deal of force is required to remove the cap 104, spillage of a portion of the contents of the container often occurs during the removal process. Further, once the cap 104 is removed, a spout attachment 108 must be affixed to the base 102 of the fitment 100. Many prior spout attachments 108 are ineffective because the material the spout attachment 108 is made of is not compatible for use with a peristaltic pump which is often used in food dispensing systems. (See FIG. 7.) Specifically, many prior spout attachments 108 are made of a material that is too rigid to be deformed by the pump or that have insufficient recovery to stress, such that the spout attachment 108 becomes permanently deformed and rendered incapable of delivering fluids.

For these reasons, it is desirable to produce a fitment for a flexible container and to provide a method of using the same, that is easy to assemble and install into a dispensing system and that minimizes contamination to the contents of the flexible container.

SUMMARY OF THE INVENTION

The present invention provides an improved fitment assembly for a flexible container and method of using the same. Such fitment minimizes contamination and provides easy accessibility to the contents of a flexible container, and is especially suitable for use with a dispensing system having a peristaltic pump.

According to the present invention, a fitment assembly for a flexible container is provided comprising, a base assembly having an outlet port, a neck portion, skirt portion, and a base portion. The base portion and skirt portion have inner and outer surfaces and are peripherally attached to the flexible container. The neck portion also has inner and outer surfaces and is coaxially mounted to the base portion. The neck portion has a diameter less than a diameter of the base portion.

The base assembly of the present invention is a preferred one-piece assembly to prevent against air exposure and that hermetically seals the container. A preferred fitment assembly includes a cap attached to the neck portion for sealing the outlet port. Preferably, the neck portion has threads to threadibly engage the cap.

The present invention also provides a preferred fitment assembly that includes the above base assembly having an outlet port, a base portion, skirt portion, and a neck portion, wherein a barrier material is removably attached to the neck portion of the base assembly to seal the outlet port.

An alternative embodiment further includes a spout body, having first and second ends and inner and outer surfaces, and an adaptor attached to the neck portion of the base assembly. The adaptor defines a fluid flow path between the base assembly and the spout body. The adaptor and neck portion preferably contain threads and are threadibly attached.

The present invention also provides for a method of using the fitment to dispense the contents of the flexible container. The method includes providing a base assembly having an outlet port, neck portion, skirt portion, and base portion. The method further includes removably attaching a cap to the neck portion. To access the contents of the container, the cap is removed from the neck portion of the base assembly and a spout body is provided. The spout body has an adaptor for securing the spout body onto the neck portion of the base assembly to define a fluid flow path between the base assembly and the spout body. The adaptor is secured onto the neck portion and the contents of the container are dispensed through the fitment.

A preferred method of the present invention further includes sealing the outlet port of the base assembly with a barrier material. To access the contents of the container, the barrier material is peeled away from the neck portion. A spout body is then secured onto the neck portion of the base assembly.

In an alternate method, the method includes providing a piercing member centrally disposed on the adaptor for inserting into the outlet port of the base assembly. The alternate method further includes piercing the barrier material by attaching the adaptor to the neck portion.

A preferred method may also include mounting the flexible container into a dispensing system and securing the spout body inside the dispensing system. The contents of the flexible container are then dispensed through the fitment.

BRIEF DESCRIPTION OF DRAWINGS

FIG. 6 is an end-view of an alternate embodiment of the spout body of the present invention; and FIG. 7 is a perspective view of a flexible container within a dispensing system having a peristaltic pump as used in the methods of the present invention.

FIG. 8 is a perspective view of a prior art fitment having a base and a spout attachment.

FIG. 9 is a perspective view of a prior art fitment having a base and a cap attached to the base.

DETAILED DESCRIPTION

Figure 1:
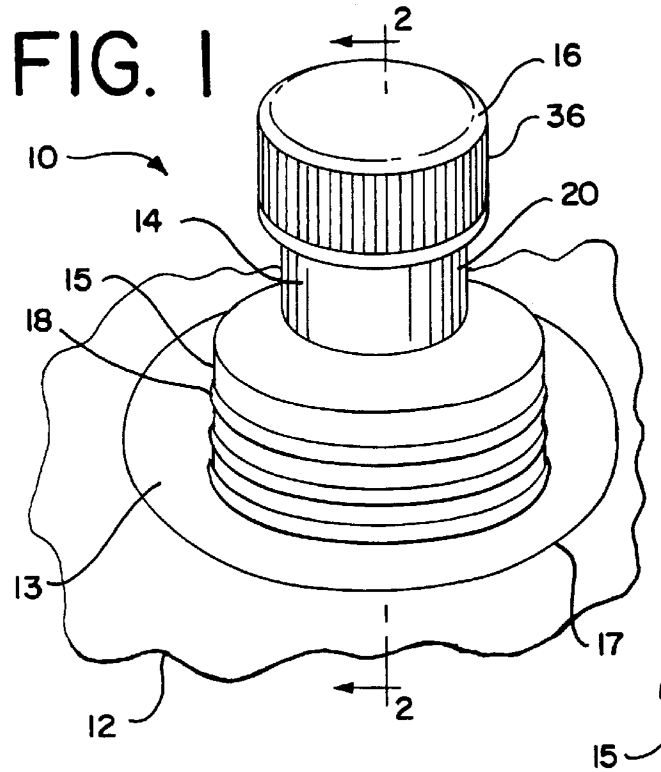
FIG. 1 is a perspective view of a base assembly of the present invention with cap attached.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 shows a fitment assembly 10 for a flexible container 12. The fitment assembly 10 having a base assembly 14 is depicted with a cap 16 attached. The base assembly 14 is peripherally attached to the flexible container 12 by a flange 13. A potion of the flange 13 attaches to an inner side of a sidewall 17 of the container 12 and the remainder of the base assembly 14 projects through a hole in the sidewall 17 to provide access to the contents of the flexible container 12.

Figure 2A:
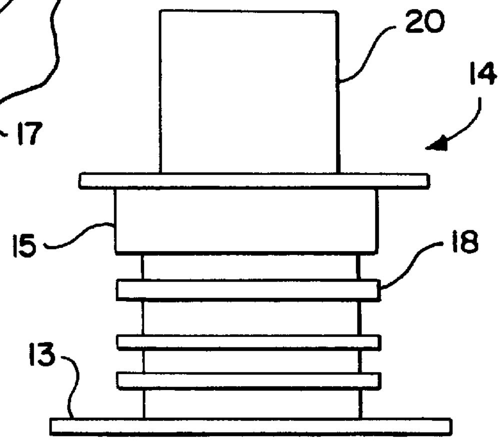
FIG. 2*a* is a perspective view of the base assembly of the present invention.
Figure 2:
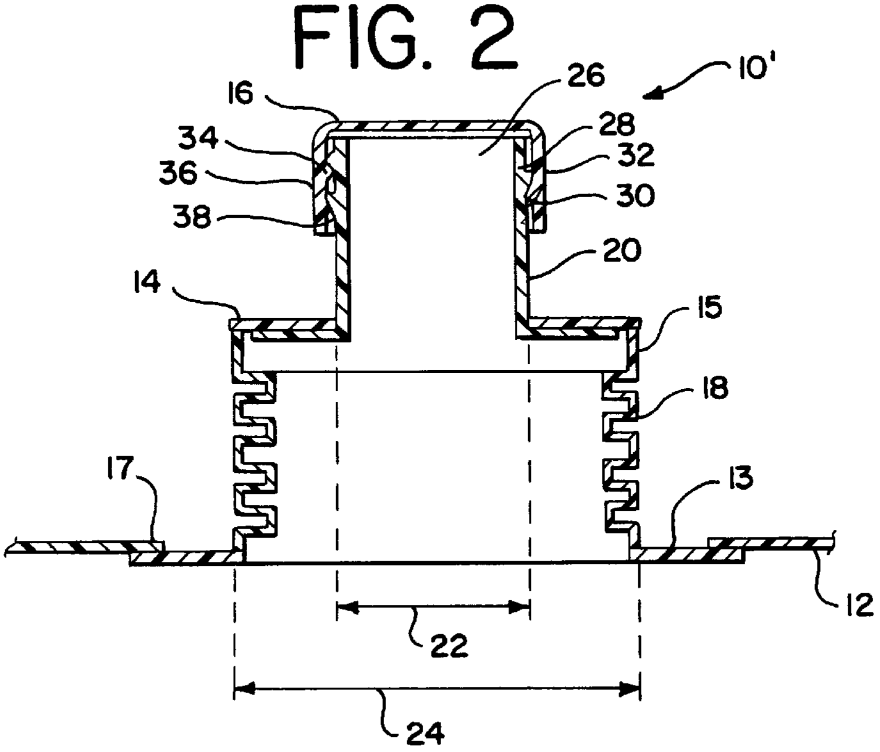
FIG. 2 is a cross-sectional view of the neck and skirt portion of the base assembly of the present invention with cap attached.

As shown in FIGS. 2 and **2*a*, the base assembly 14 has a neck portion 20, skirt portion 15, and base portion 18. The neck portion 20 is coaxially mounted to the skirt portion 15. The base assembly 14 shown has an outlet port 26. The neck portion 20 of the base assembly 14 has an inner surface 28 and an outer surface 30. (See FIG. 2.) The neck portion 20 has a diameter 22 that is smaller in dimension than a diameter 24 of the skirt portion 18. The outer surface 30 of the neck portion 20 preferably has threads 32. The threads 32 of the neck portion 20 are shown threadibly engaged with threads 34 of the cap 16. The cap 16 has an outer surface 36 and an inner surface 38, and the threads 34 preferably are on the inner surface 38**.

Figure 3:
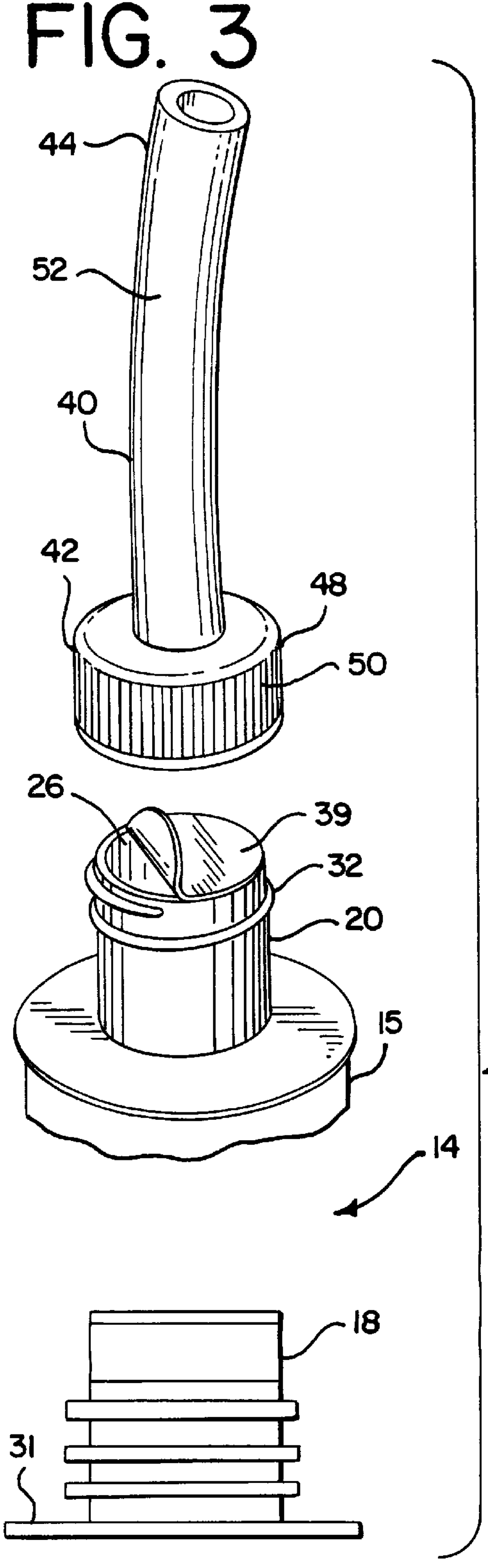
FIG. 3 is a perspective view of a spout body and base assembly of the present invention.

FIG. 3 shows a fitment system 10" comprising a spout body 40, and an unassembled base assembly 14. The neck portion 20 and the skirt portion 15 of the base assembly 14 are preferably attached to the base portion 18 by a snap fit or threadibly attached before the fitment container 12 is heat sterilized. FIG. 3 further shows the base assembly 14 having a barrier material 39, shown partially peeled away from the outlet port 26. Preferably, the barrier material 39 is made of a metal foil and provides a hermetic seal for the flexible container 12 (shown in FIG. 7). The foil may be attached to the base assembly through induction sealing techniques or other techniques known in the art. It is also possible to use other barrier materials such as polymeric materials such as ethylene vinyl alcohol or polyvinylidene chloride containing films.

A spout body 40 is shown having a first end 42 and a second end 44. The spout body 40 has an inner surface 46 (shown in FIGS. 4 and 5) and an outer surface 48. The first end 42 has an adaptor 50 for attaching to the neck portion 20 of the base assembly 14 for defining a fluid flow path between the base assembly 14 and the spout body 40. The adaptor 50 has a hub 51 projecting axially away from the adaptor 50. A tube 52 is dimensioned to fit over the hub 51 and grip thereto. Preferably, the spout body 40 is made of a polymeric material, preferably a polyolefin, such as polypropylene or polyethylene or other polymeric material such as homopolymers and copolymers of polycarbonite, polyester, polyamide, and polyimide. The tube 52, however, is preferably made of a material having sufficient elasticity to be compatible with pumps that use the tube 52 as the pump body. That is, the pumps that move fluid through the tube 52 by pressing on the tube 52.

Figure 4:
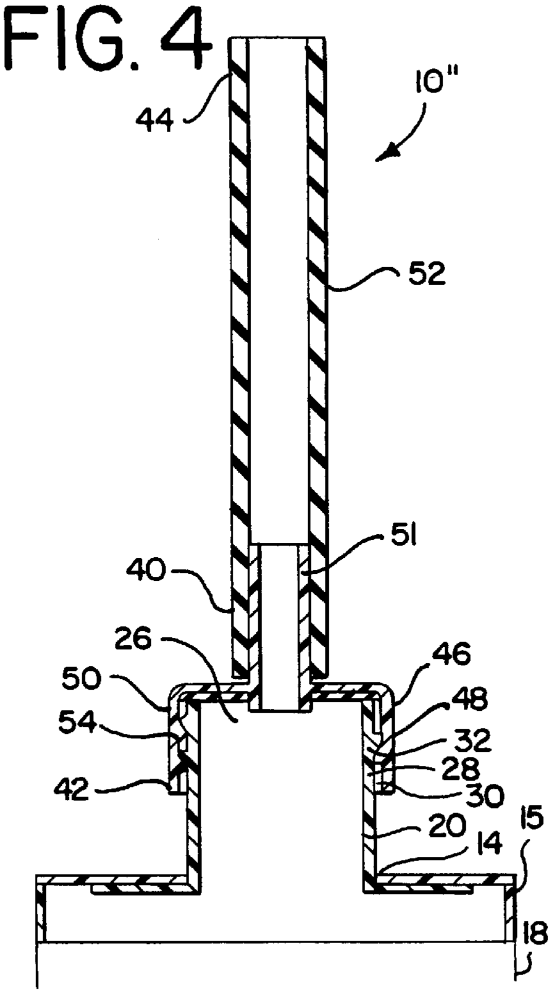
FIG. 4 is a cross-sectional view of the base assembly of the present invention with spout body attached.

FIG. 4 shows fitment 10" having the spout body 40 attached to the base assembly 14. As shown in FIG. 4, the adaptor 50 has threads 54 on the inner surface 46. The threads 54 of the spout body 40 are shown engaged with the threads 32 on the outer surface 30 of the neck portion 20 of the base assembly 14. The spout body 40 may also attach to the neck portion 20 using a snap fit.

Figure 5:
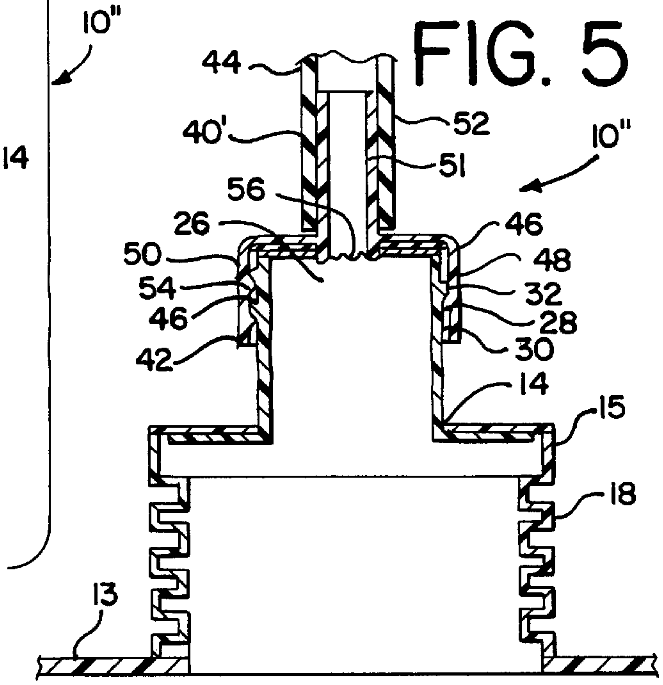
FIG. 5 is a cross-sectional view of an alternate embodiment of the spout body of the present invention attached to the base assembly.

FIG. 5 shows the fitment assembly 10'" having an optional piercing member 56 disposed on the alternate spout body 40'. In a preferred form, as shown in FIGS. 5 and 6, the piercing member 56 is centrally disposed and dimensioned to insert into the outlet port 26 of the base assembly 40. While the spout body 40' is being attached to the base assembly 14 the piercing member pierces the barrier material 39 (shown in FIG. 3) sealing the outlet port 26.

FIG. 7 illustrates a flexible container 12 installed within a dispensing system 60 having a fluid delivery pump such as a peristaltic pump 62, as used in the methods of the present invention. The method for using a fitment 10 to dispense the contents of a flexible container 12 includes, providing a base assembly 14 having an outlet port 26, a base portion 18, a skirt portion 15, and a neck portion 20 having an inner surface 28 and outer surface 30, and providing a cap 16 releasably attached to the neck portion 20. The method also includes providing a spout body 40 having first end 42 and second end 44 and inner surface 46 and outer surface 48, the first end 42 having an adaptor 50. The cap 16 is removed from the neck portion 20 of the base assembly 14 and the adaptor 50 of the spout body 40 is secured to the neck portion 20 of the base assembly 14 to define a fluid flow path between the base assembly 14 and the spout body 40, and the contents of the flexible container 12 are dispensed through the fitment 10.

The method of the present invention may further include, providing a barrier material 39 affixed to the neck portion 20, and sealing the outlet port 26 of the base assembly 14 with the barrier material 39 and peeling the barrier material away from the neck portion of the base assembly.

In the alternative, instead of peeling the barrier material 39, a piercing member 56 centrally disposed on the adaptor 50 is provided for piercing the barrier material 39 when attaching the adaptor 50 to the base assembly 14. In a preferred form, the piecing member 56 is dimensioned to insert into the outlet port 26 of the base assembly 14.

The method may include the step of piercing the barrier material 39 with the piercing member 56 by threadibly attaching the adaptor 50 onto the neck portion 20.

The method of may also include the step of dispensing the contents of the container 12 through the fitment 10'" by providing a dispensing system 60, mounting the flexible container 12 into a dispensing system, and securing the spout body 40 inside the dispenser system 60. This method may include providing a peristaltic pump 62 as a dispensing system 60.

The method of may further include, providing a dispensing system 60 having a housing 70 with an opening 68, inserting the tube 52 of the spout body 40 through the opening 68 of the dispensing housing 70, compressing the tube 52 of the spout body 40, and dispensing a predetermined amount of liquid.

A preferred method may also include mounting the flexible container 12 into a dispensing system 60 and securing the spout body 40 inside the dispensing system 60. The contents of the flexible container 12 are then dispensed through the fitment 10'''.

In FIG. 7, the dispensing system is shown having a refrigeration or heating unit 66. The peristaltic pump 62 has rotors 64. The rotors 64 are shown compressing the tube 52 on a downward stroke of the rotors 64. This compression causes a predetermined amount of the liquid contents of the container to flow through the fitment 10'''.

Because of the increased sealing ability, the base assembly 14 is shown in FIGS. 1–5 as a preferred one-piece molded assembly. The base assembly 14, however, may consists of separate components (i.e., base portion 18 and neck portion 20) attached together to form the base assembly 14. These parts may be made using standard injection molding techniques as are well known in the art. Further, the base assembly 14 and spout body 40 have been described and shown as generally cylindrically shaped. It is anticipated, however, that the base assembly 14 and spout body 40 could have various other shapes without departing from the present invention.

While the specific embodiments have been illustrated and described, numerous modifications come to mind without significantly departing from the spirit of the invention and the scope of protection is only limited by the scope of the accompanying claims.

I claim:

1. A fitment assembly for a flexible container comprising:

a generally cylindrical base assembly having a base portion having a first end and a second end, the base portion adapted to be peripherally attached to the flexible container adjacent the first end of the base portion, a skirt portion removably connected to the second end of the base portion and a neck portion coaxially mounted to the skirt portion, the neck portion having inner and outer surfaces and an outlet port, wherein the neck portion has an inner diameter less than an inner diameter of the base portion; and, a barrier material attached to the neck portion to seal the outlet port.

2. The assembly of claim 1 further comprising threads on the neck portion.

3. The assembly of claim 2 wherein the threads are on an outer surface of the neck portion.

4. The assembly of claim 2 wherein the threads are on an inner surface of the neck portion.

5. The assembly of claim 2 further comprising a spout body and a flexible tube, the spout body having first and second ends and inner and outer surfaces, the first end having an adaptor, the adaptor having threads which rotatably mate with the threads on the neck portion to removably attach the spout body to the neck portion of the base assembly to define a fluid flow path between the base assembly and the spout body, wherein the flexible tube extends axially away from the spout body opposite the adaptor.

6. The assembly of claim 5 further comprising a piercing member adapted to penetrate the barrier material, wherein the piercing member is centrally disposed on the adaptor and is dimensioned to insert into the outlet port.

7. The assembly of claim 1 wherein the barrier material is a cap, the cap having threads thereon for connecting the cap to the neck portion, the threads on the cap rotatably mating with the threads on the neck portion.

8. The assembly of claim 1 further comprising a cap, wherein the cap has threads on a surface thereof, said threads on the cap for threadibly engaging mating threads on the neck portion to connect the cap to the neck portion.

9. A fitment assembly for a flexible container comprising:

a generally cylindrical base assembly having a base portion having a first end and a second end, the base portion adapted to be peripherally attached to the flexible container adjacent the first end of the base portion, and a neck portion coaxially mounted to the base portion and having inner and outer surfaces and an outlet port, wherein the neck portion has an inner diameter which is less than an inner diameter of the base portion, and wherein threads are on the neck portion;

a barrier material attached to the neck portion;

a spout body having first and second ends and inner and outer surfaces, the first end having an adaptor, the adaptor having threads which rotatably mate with the threads on the neck portion to removably attach the spout body to the neck portion of the base assembly to define a fluid flow path between the base assembly and the spout body; and, a flexible tube extending axially away from the spout body opposite the adaptor.

10. The assembly of claim 9 wherein the barrier material is a cap.

11. The assembly of claim 9 further comprising a cap, the cap having threads thereon for connecting the cap to the neck portion, the threads on the cap rotatably mating with the threads on the neck portion.

12. The assembly of claim 9 further comprising a piercing member adapted to penetrate the barrier material, wherein the piercing member is centrally disposed on the adaptor and dimensioned to insert into the outlet port.

13. A method for using a fitment to dispense the contents of a flexible container comprising the steps of:

providing a base assembly having an outlet port, a base portion, and a neck portion having inner and outer surfaces;

providing a cap releasably attached to the neck portion, wherein the neck portion has one of male or female threads thereon, and wherein the cap has the other one of male or female threads thereon for rotatably mating the cap with the neck portion;

providing a spout body having first and second ends and inner and outer surfaces, the first end having an adaptor, the second end having a flexible tubing connected thereto;

removing the cap from the neck portion of the base assembly by unscrewing the cap from the neck portion;

securing the adaptor of the spout body to the neck portion of the base assembly to define a fluid flow path between the base assembly and the spout body; and dispensing the contents of the flexible container through the fitment.

14. The method of claim 13 further comprising the steps of:

providing a barrier material affixed to the neck portion; and, sealing the outlet port of the base assembly with the barrier material.

15. The method of claim 14 further comprising the step of:

peeling the barrier material away from the neck portion of the base assembly.

16. The method of claim 14 further comprising the steps of:

providing a piercing member centrally disposed on the adaptor, dimensioned to insert into the outlet port of the base assembly; and piercing the barrier material with the piercing member.

17. The method of claim 13, wherein the step of securing the adaptor to the neck portion of the base assembly further comprises the steps of:

providing a barrier material; piercing member;

sealing the outlet port of the base assembly with the barrier material; and removing the barrier material while securing the adaptor to the neck portion.

18. The method of claim 17 wherein the barrier material is made of foil.

19. The method of claim 13 wherein the threads are on an outer surface of the neck portion.

20. The method of claim 13 wherein the threads are on an inner surface of the neck portion.

21. The method of claim 13 further comprising the step of:

threading the cap onto the neck portion.

22. The method of claim 13 further comprising threads on the adaptor, wherein the step of securing the adaptor to the neck portion of the base assembly further comprises the step of:

threading the adaptor onto the neck portion of the base assembly.

23. The method of claim 22 further comprising the step of:

piercing the barrier material with a piercing member by threadibly attaching the adaptor onto the neck portion.

24. The method of claim 13 wherein the step of dispensing the contents of the container through the fitment further comprising the steps of:

providing a dispensing system;

mounting the flexible container into a dispensing system; and securing the spout body inside the dispenser system.

25. The method of claim 24 wherein the dispensing system is a peristaltic pump.

26. The method of claim 25 further comprising the steps of:

providing a dispensing system having a housing with an opening;

inserting the tube of the spout body through the opening of the dispensing housing;

compressing the tube of the spout body; and, dispensing a predetermined amount of liquid.

* * * * *